(12) United States Patent
Schmidt (10) Patent No.: US 6,450,758 B1
(45) Date of Patent: Sep. 17, 2002

(54) COOLING SYSTEM FOR A BEARING OF A TURBINE ROTOR

(75) Inventor: Mark Christopher Schmidt, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/566,085

(22) Filed: May 9, 2000

Related U.S. Application Data (63) Continuation of application No. 09/218,229, filed on Dec. 22, 1998.

(51) Int. Cl.[7] ............................................. F01D 7/00
(52) U.S. Cl. ...................................................... 415/115
(58) Field of Search ................................ 415/115, 116; 416/95, 96 R, 96 A, 97 R (56) References Cited

U.S. PATENT DOCUMENTS

| | | | |
|---|---|---|---|
| 2,788,951 A | | 4/1957 | Flint |
| 5,540,546 A | * | 7/1996 | Bouricet ..................... 415/112 |
| 5,593,165 A | * | 1/1997 | Murray et al. .............. 415/111 |
| 5,738,488 A | | 4/1998 | Gazzillo et al. |
| 6,053,701 A | * | 4/2000 | Ichiryu et al. ............. 416/96 R |
| 6,146,090 A | * | 11/2000 | Schmidt ..................... 416/96 A |
| 6,155,040 A | * | 12/2000 | Sasaki .......................... 416/95 |
| 6,224,327 B1 | * | 5/2001 | Aoki et al. ................... 416/95 |

FOREIGN PATENT DOCUMENTS

| | | |
|---|---|---|
| BE | 468401 | 10/1966 |
| EP | 0894942 | 2/1999 |
| EP | 1010858 | 6/2000 |
| FR | 1059967 | 3/1954 |

OTHER PUBLICATIONS

"39th GE Turbine State–of–the–Art Technology Seminar", Tab 1, ""F" Technology—the First Half–Million Operating Hours", H.E. Miller.
"39th GE Turbine State–of–the–Art Technology Seminar", Tab 2, "GE Heavy–Duty Gas Turbine Performance Characteristics", F. J. Brooks.
"39th GE Turbine State–of–the–Art Technology Seminar", Tab 3, "9EC 50Hz 170–MW Class Gas Turbine", A. S. Arrao.
"39th GE Turbine State–of–the–Art Technology Seminar", Tab 4, "MWS6001FA—An Advanced–Technology 70–MW Hz Gas Turbine", Ramachandran et al.
"39th GE Turbine State–of–the–Art Technology Seminar", Tab 5, "Turbomachinery Technology Advances at Nuovo Pignone", Benvenuti et al.

(List continued on next page.)

*Primary Examiner*—Edward K. Look
*Assistant Examiner*—James M McAleenan
(74) *Attorney, Agent, or Firm*—Nixon & Vanderhye (57) ABSTRACT

In a gas turbine, a bore tube assembly radially inwardly of an aft bearing conveys cooling steam to the buckets of the turbine and returns the cooling steam to a return. To cool the bearing and thermally insulate the bearing from the cooling steam paths, a radiation shield is spaced from the bore tube assembly by a dead air gap. Additionally, an air passageway is provided between the radiation shield and the inner surface of an aft shaft forming part of the rotor. Air is supplied from an inlet for flow along the passage and radially outwardly through bores in the aft shaft disk to cool the bearing and insulate it from transfer of heat from the cooling steam.

17 Claims, 6 Drawing Sheets

OTHER PUBLICATIONS

"39th GE Turbine State–of–the–Art Technology Seminar", Tab 6, "GE Aeroderivative Gas Turbines—Design and Operating Features", M.W. Horner.

"39th GE Turbine State–of–the–Art Technology Seminar", Tab 7, "Advance Gas Turbine Materials and Coatings", P.W. Schilke.

"39th GE Turbine State–of–the–Art Technology Seminar", Tab 8, "Dry Low $NO_x$ Combustion Systems for GE Heavy–Duty Turbines", L. B. Davis.

"39th GE Turbine State–of–the–Art Technology Seminar", Tab 9, "GE Gas Turbine Combustion Flexibility", M. A. Davi.

"39th GE Turbine State–of–the–Art Technology Seminar", Tab 10, "Gas Fuel Clean–Up System Design Considerations for GE Heavy–Duty Gas Turbines", C. Wilkes.

"39th GE Turbine State–of–the–Art Technology Seminar", Tab 11, "Integrated Control Systems for Advanced Combined Cycles", Chu et al.

"39th GE Turbine State–of–the–Art Technology Seminar", Tab 12, "Power Systems for the 21st Century "H" Gas Turbine Combined Cycles", Paul et al.

"39th GE Turbine State–of–the–Art Technology Seminar", Tab 13, "Clean Coal and Heavy Oil Technologies for Gas Turbines", D. M. Todd.

"39th GE Turbine State–of–the–Art Technology Seminar", Tab 14, "Gas Turbine Conversions, Modifications and Uprates Technology", Stuck et al.

"39th GE Turbine State–of–the–Art Technology Seminar", Tab 15, "Performance and Reliability Improvements for Heavy–Duty Gas Turbines,"J. R. Johnston.

"39th GE Turbine State–of–the–Art Technology Seminar", Tab 16, "Gas Turbine Repair Technology", Crimi et al.

"39th GE Turbine State–of–the–Art Technology Seminar", Tab 17, "Heavy Duty Turbine Operating & Maintenance Considerations", R. F. Hoeft.

"39th GE Turbine State–of–the–Art Technology Seminar", Tab 18, "Gas Turbine Performance Monitoring and Testing", Schmitt et al.

"39th GE Turbine State–of–the–Art Technology Seminar", Tab 19, "Monitoring Service Delivery System and Diagnostics", Madej et al.

"39th GE Turbine State–of–the–Art Technology Seminar", Tab 20, "Steam Turbines for Large Power Applications", Reinker et al.

"39th GE Turbine State–of–the–Art Technology Seminar", Tab 21, "Steam Turbines for Ultrasupercritical Power Plants", Retzlaff et al.

"39th GE Turbine State–of–the–Art Technology Seminar", Tab 22, "Steam Turbine Sustained Efficiency", P. Schofield.

"39th GE Turbine State–of–the–Art Technology Seminar", Tab 23, "Recent Advances in Steam Turbines for Industrial and Cogeneration Applications", Leger et al.

"39th GE Turbine State–of–the–Art Technology Seminar", Tab 24, "Mechanical Drive Steam Turbines", D. R. Leger.

"39th GE Turbine State–of–the–Art Technology Seminar", Tab 25, "Steam Turbines for STAG™ Combined–Cycle Power Systems", M. Boss.

"39th GE Turbine State–of–the–Art Technology Seminar", Tab 26, "Cogeneration Application Considerations", Fisk et al.

"39th GE Turbine State–of–the–Art Technology Seminar", Tab 27, "Performance and Economic Considerations of Repowering Steam Power Plants", Stoll et al.

"39th GE Turbine State–of–the–Art Technology Seminar", Tab 28, "High–Power–Density™ Steam Turbine Design Evolution", J. H. Moore.

"39th GE Turbine State–of–the–Art Technology Seminar", Tab 29, "Advances in Steam Path Technologies", Cofer, IV, et al.

"39th GE Turbine State–of–the–Art Technology Seminar", Tab 30, "Upgradable Opportunities for Steam Turbines", D. R. Dreier, Jr.

"39th GE Turbine State–of–the–Art Technology Seminar", Tab 31, "Uprate Options for Industrial Turbines", R. C. Beck.

"39th GE Turbine State–of–the–Art Technology Seminar", Tab 32, "Thermal Performance Evaluation and Assessment of Steam Turbine Units", P. Albert.

"39th GE Turbine State–of–the–Art Technology Seminar", Tab 33, "Advances in Welding Repair Technology" J. F. Nolan.

"39th GE Turbine State–of–the–Art Technology Seminar", Tab 34, "Operation and Maintenance Strategies to Enhance Plant Profitability", MacGillivray et al.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al.

"39th GE Turbine State–of–the–Art Technology Seminar", Tab 37, "GE Combined Cycle Product Line and Performance", Chase, et al.

"39th GE Turbine State–of–the–Art Technology Seminar", Tab 38, "GE Combined Cycle Experience", Maslak et al.

"39th GE Turbine State–of–the–Art Technology Seminar", Tab 39, "Single–Shaft Combined Cycle Power Generation Systems", Tomlinson et al.

"Advanced Turbine System Program—Conceptual Design and Product Development", Annual Report, Sep. 1, 1994–Aug. 31, 1995.

"Advanced Turbine System (ATS Program) Conceptual Design and Product Development", Final Technical Progress Report, vol. 2–Industrial Machine, Mar. 31, 1997, Morgantown, WV.

"Advanced Turbine Systems (ATS Program), Conceptual Design and Product Development", Final Technical Progress Report, Aug. 31, 1996, Morgantown, WV.

"Advanced Turbine Systems (ATS) Program, Phase 2, Conceptual Design and Product Development", Yearly Technical Progress Report, Reporting Period: Aug. 25, 1993–Aug. 31, 1994.

"Advanced Turbine Systems" Annual Program Review, Preprints, Nov. 2–4, 1998, Washington, D.C. U.S. Department of Energy, Office of Industrial Technologies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Nos. DE–FC21–95MC31176–11.

"Exhibit panels used at 1995 product introduction at PowerGen Europe".

"Extensive Testing Program Validates High Efficiency, reliability of GE's Advanced "H" Gas Turbine Technology", Press Information, Press Release, 96–NR14, Jun. 26, 1996, H Technology Tests/pp. 1–4.

"Extensive Testing Program Validates High Efficiency, Reliability of GE's Advanced "H" Gas Turbine Technology", GE Introduces Advances Gas Turbine Technology Platform: First to Reach 60% Combined–Cycle Power Plant Efficiency, Press Information, Press Release, Power–Gen Europe '95, 95–NRR15, Advanced Technology Introduction/pp. 1–6.

"Gas, Steam Turbine Work as Single Unit in GE's Advanced H Technology Combined–Cycle System", Press Information, Press Release, 95–NR18, May 16, 1995, Advanced Technology Introduction/pp. 1–3.

"GE Breaks 60% Net Efficiency Barrier" paper, 4 pages.

"GE Business Share Technologies and Experts to Develop State–Of–The–Art Products", Press Information, Press Release 95–NR10, May 16, 1995, GE Technology Transfer/pp. 1–3.

"General Electric ATS Program Technical Review, Phase 2 Activities", T. Chance et al., pp. 1–4.

"General Electric's DOE/ATS H Gas Turbine Development" Advanced Turbine Systems Annual Review Meeting, Nov. 7–8, 1996, Washington, D.C., Publication Release.

"H Technology Commercialization", 1998 MarComm Activity Recommendation, Mar., 1998.

"H Technology", Jon Ebacher, VP, Power Gen Technology, May 8, 1998.

"H Testing Process", Jon Ebacher, VP, Power Gen Technology, May 8, 1998.

"Heavy–Duty & Aeroderivative Products" Gas Turbines, Brochure, 1998.

"MS7001H/MS9001H Gas Turbine, gepower.com website for PowerGen Europe" Jun. 1–3 going public Jun. 15, (1995).

"New Steam Cooling System is a Key to 60% Efficiency For GE "H" Technology Combined–Cycle Systems", Press Information, Press Release, 95–NRR16, May 16, 1995, H Technology/pp. 1–3.

"Overview of GE's H Gas Turbine Combined Cycle", Jul. 1, 1995 to Dec. 31, 1997.

"Power Systems for the $21^{st}$ Century—"H" Gas Turbine Combined Cycles", Thomas C. Paul et al., Report.

"Power–Gen '96 Europe", Conference Programme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement"; various newspaper clippings relating to improved generator.

"Proceedings of the Advanced Turbine Systems Annual Program Review Meeting", vol. I, "Industrial Advanced Turbine Systems Program Overview", D.W. Esbeck, p. 3.

"Proceedings of the Advanced Turbine Systems Annual Program Review Meeting", vol. I, "H Gas Turbine Combined Cycle", J. Corman, p. 14.

"Proceedings of the Advanced Turbine Systems Annual Program Review Meeting", vol. I, "Overview of Westinghouse's Advanced Turbine Systems Program", Bannister et al., p. 22.

"Proceedings of the Advanced Turbine Systems Annual Program Review Meeting", vol. 1, "Allison Engine ATS Program Technical Review", D. Mukavetz, p. 31.

"Proceedings of the Advanced Turbine Systems Annual Program Review Meeting", vol. I, "Advanced Turbine Systems Program Industrial System Concept Development", S. Gates, p. 43.

"Proceedings of the Advanced Turbine Systems Annual Program Review Meeting", vol. I, "Advanced Turbine System Program Phase 2 Cycle Selection", Latcovich, Jr., p. 64.

"Proceedings of the Advanced Turbine Systems Annual Program Review Meeting", vol. I, "General Electric ATS Program Technical Review Phase 2 Activities", Chance et al., p. 70.

"Proceedings of the Advanced Turbine Systems Annual Program Review Meeting", vol. I, "Technical Review of Westinghouse's Advanced Turbine Systems Program", Diakunchak et al., p. 75.

"Proceedings of the Advanced Turbine Systems Annual Program Review Meeting", vol. I, "Advanced Combustion Turbines and Cycles: An EPRI Perspective", Touchton et al., p. 87.

"Proceedings of the Advanced Turbine Systems Annual Program Review Meeting", vol. I, "Advanced Turbine Systems Annual Program Review", William E. Koop, p. 89.

"Proceedings of the Advanced Turbine Systems Annual Program Review Meeting", vol. I, "The AGTSR Consortium: An Update", Fant et al., p. 93.

"Proceedings of the Advanced Turbine Systems Annual Program Review Meeting", vol. I, "Overview of Allison/AGTSR Interactions", Sy A. Ali, p. 103.

"Proceedings of the Advanced Turbine Systems Annual Program Review Meeting", vol. I, "Design Factors for Stable Lean Premix Combustion", Richards et al., p. 107.

"Proceedings of the Advanced Turbine Systems Annual Program Review Meeting", vol. I, "Ceramic Stationary as Turbine", M. van Roode, p. 114.

"Proceedings of the Advanced Turbine Systems Annual Program Review Meeting", vol. I, "DOE/Allison Ceramic Vane Effort", Wenglarz et al., p. 148.

"Proceedings fo the Advanced Turbine Systems Annual Program Review Meeting", vol. I, "Materials/Manufacturing Element of the Advanced Turbine Systems Program", Karnitz et al., p. 152.

"Proceedings of the Advanced Turbine Systems Annual Program Review Meeting", vol. I, "Land–Based Turbine Casting Initiative", Mueller et al., p. 161.

"Proceedings of the Advanced Turbine Systems Annual Program Review Meeting", vo.l I, "Pratt & Whitney Thermal Barrier Coatings", Bornstein et al., p. 182.

"Proceedings of the Advanced Turbine Systems Annual Program Review Meeting", vol. I, "Westinhouse Thermal Barrier Coatings", Goedjen et al., p. 194.

"Proceedings of the Advanced Turbine Systems Annual Program Review Meeting", vol. I, "High Performance Steam Development", Duffy et al., p. 200.

"Proceedings of the Advanced Turbine Systems Annual Program Review Meeting", vol. II, "Lean Premixed Combustion Stabilized by Radiation Feedback and heterogeneous Catalysis", Dibble et al., p. 221.

"Proceedings of the Advanced Turbine Systems Annual Program Review Meeting", vol. II, Rayleigh/Raman/LIF Measurements in a Turbulent Lean Premixed Combustor, Nandula et al. p. 233.

"Proceedings of the Advanced Turbine Systems Annual Program Review Meeting", vol. II, "Lean Premixed Flames for Low $No_x$ Combustors", Sojka et al., p. 249.

"Proceedings of the Advanced Turbine Systems Annual Program Review Meeting", vol. II, "Functionally Gradient Materials for Thermal Barrier Coatings in Advanced Gas Turbine Systems", Banovic et al., p. 276.

"Proceedings of the Advanced Turbine Systems Annual Program Review Meeting", vol. II, "Advanced Turbine Cooling, Heat Transfer, and Aerodynamic Studies", Han et al., p. 281.

"Proceedings of the Advanced Turbine Systems Annual Program Review Meeting", vol. II, "Life Prediction of Advanced Materials for Gas Turbine Application", Zamrik et al., p. 310.

"Proceedings of the Advanced Turbine Systems Annual Program Review Meeting", vol. II, "Advanced Combustion Technologies gor Gas Turbine Power Plants", Vandsburger et al., p. 328.

"Proceedings of the Advanced Turbine Systems Annual Program Review Meeting", vol. II, "Combustion Modeling in Advanced Gas Turbine Systems", Smoot et al., p. 353.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al. p. 371.

"Proceedings of the Advanced Turbine Systems Annual Program Review Meeting", vol. II, "Rotational Effects on Turbine Blade Cooling", Govatzidakia et al., p. 391.

"Proceedings of the Advanced Turbine Systems Annual Program Review Meeting", vol. II, "Manifold Methods for Methane Combustion", Yang et al., p. 393.

"Proceedings of the Advanced Turbine Systems Annual Program Review Meeting", vol. II, "Advanced Multistage Turbine Blade Aerodynamics, Performance, Cooling, and Heat Transfer", Fleeter et al., p. 410.

"Proceedings of the Advanced Turbine Systems Annual Program Review Meeting, vol. II", The Role of Reactant Unmixedness, Strain Rate, and Length Scale on Premixed Combustor Performance, Samuelsen et al., p. 415.

"Proceedings of the Advanced Turbine Systems Annual Program Review Meeting", vol. II, "Experimental and Computational Studies of Film Cooling With Compound Angle Injection", Goldstein et al., p. 423.

"Proceedings of the Advanced Turbine Systems Annual Program Review Meeting", vol. II, "Compatibility of Gas Turbine Materials with Steam Cooling", Desai et al., p. 452.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, p. 465.

"Proceedings of the Advanced Turbine Systems Annual Program Review Meeting", vol. II, Effects of Geometry on Slot–Jet Film Cooling Performance, Hyams et al., p. 474.

"Proceedings of the Advanced Turbine Systems Annual Program Review Meeting", vol. II, "Steam as Turbine Blade Coolant: Experimental Data Generation", Wilmsen et al., p. 497.

"Proceedings of the Advanced Turbine Systems Annual Program Review Meeting", vol. II, "Combustion Chemical Vapor Deposited Coatings for Thermal Barrier Coating Systems", Hampikian et al., p. 506.

"Proceedings of the Advanced Turbine Systems Annual Program Review Meeting", vol. II, "Premixed Burner Experiments: Geometry, Mixing, and Flame Structure Issues", Gupta et al., p. 516.

"Proceedings of the Advanced Turbine Systems Annual Program Review Meeting", vol. II, "Intercooler Flow Path for Gas Turbines: CFD Design and Experiments", Agrawal et al., p. 529.

"Proceedings of the Advanced Turbine Systems Annual Program Review Meeting", vol. II, "Bond Strength and Stress Measurements in Thermal Barrier Coatings", Gell et al., p. 539.

"Proceedings of the Advanced Turbine Systems Annual Program Review Meeting", vol. II, "Active Control of Combustion Instabilities in Low $NO_x$ Gas Turbines", Zinn et al., p. 550.

"Proceedings of the Advanced Turbine Systems Annual Program Review Meeting", vol. II, "Combustion Instability Modeling and Analysis", Santoro et al., p. 552.

"Proceedings of the Advanced Turbine Systems Annual Program Review Meeting", vol. II, "Flow and Heat Transfer in Gas Turbine Disk Cavities Subject to Nonuniform External Pressure Field", Roy et al., p. 560.

"Proceedings of the Advanced Turbine Systems Annual Program Review Meeting", vol. II, "Heat Pipe Turbine Vane Cooling", Langston et al., p. 566.

"Proceedings of the Advanced Turbine Systems Annual Program Review Meeting", vol. II, "Improved Modeling Techniques for Turbomachinery Flow Fields", Lakshminarayana et al., p. 573.

"Proceedings of the Advanced Turbine Systems Annual Program Review Meeting", vol. II, "Advanced 3D Inverse Method for Designing Turbomachine Blades", T. Dang, p. 582.

"Proceedings of the Advanced Turbine Systems Annual Program Review Meeting", "ATS and the Industries of the Future", Denise Swink, p. 1.

"Proceedings of the Advanced Turbine Systems Annual Program Review Meeting", "Gas Turbine Association Agenda", William H. Day, p. 3.

"Proceedings of the Advanced Turbine Systems Annual Program Review Meeting", "Power Needs in the Chemical Industry", Keith Davidson, p. 17.

"Proceedings of the Advanced Turbine Systems Annual Program Review Meeting", "Advanced Turbine Systems Program Overview", David Esbeck, p. 27.

"Proceedings of the Advanced Turbine Systems Annual Program Review Meeting", "Westinghouse's Advanced Turbine Systems Program", Gerard McQuiggan, p. 35.

"Proceedings of the Advanced Turbine Systems Annual Program Review Meeting", "Overview of GE's H Gas Turbine Combined Cycle", Cook et al., p. 49.

"Proceedings of the Advanced Turbine Systems Annual Program Review Meeting", "Allison Advanced Simple Cycle Gas Turbine System", William D. Weisbrod, p. 73.

"Proceedings of the Advanced Turbine Systems Annual Program Review Meeting", "The AGTSR Industry–University Consortium", Lawrence P. Golan, p. 95.

"Proceedings of the Advanced Turbine Systems Annual Program Review Meeting", "$NO_x$ and CO Emissions Models for Gas–Fired Lean–Premixed Combustion Turbines", A. Mellor, p. 111.

"Proceedings of the Advanced Turbine Systems Annual Program Review Meeting", "Methodologies for Active Mixing and Combustion Control", Uri Vandsburger, p. 123.

"Proceedings of the Advanced Turbine Systems Annual Program Review Meeting", "Combustion Modeling in Advanced Gas Turbine Systems", Paul O. Hedman, p. 157.

"Proceedings of the Advanced Turbine Systems Annual Program Review Meeting", "Manifold Methods for Methane Combustion", Stephen B. Pope, p. 181.

"Proceedings of the Advanced Turbine Systems Annual Program Review Meeting", "The Role of Reactant Unmixedness, Strain Rate, and Length Scale on Premixed Combustor Performance", Scott Samuelsen, p. 189.

"Proceedings of the Advanced Turbine Systems Annual Program Review Meeting", "Effect of Swirl and Momentum Distribution on Temperature Distribution in Premixed Flames", Ashwani K. Gupta, p. 211.

"Proceedings of the Advanced Turbine Systems Annual Program Review Meeting", "Combustion Instability Studies Application to Land–Based Gas Turbine Combustors", Robert J. Santoro, p. 233.

"Proceedings of the Advanced Turbine Systems Annual Program Review Meeting", Active Control of Combustion Instabilities in Low $NO_x$ Turbines, Ben T. Zinn, p. 253.

"Proceedings of the Advanced Turbine Systems Annual Program Review Meeting", "Life Prediction of Advanced Materials for Gas Turbine Application," Sam Y. Zamrik, p. 265.

"Proceedings of the Advanced Turbine Systems Annual Program Review Meeting", "Combustion Chemical Vapor Deposited Coatings for Thermal Barrier Coating Systems", W. Brent Carter, p. 275.

"Proceedings of the Advanced Turbine Systems Annual Program Review Meeting", "Compatibility of Gas Turbine Materials with Steam Cooling", Vimal Desai, p. 291.

"Proceedings of the Advanced Turbine Systems Annual Program Review Meeting", "Bond Strength and Stress Measurements in Thermal Barrier Coatings", Maurice Gell, p. 315.

"Proceedings of the Advanced Turbine Systems Annual Program Review Meeting", "Advanced Multistage Turbine Blade Aerodynamics, Performance, Cooling and Heat Transfer", Sanford Fleeter, p. 335.

"Proceedings of the Advanced Turbine Systems Annual Program Review Meeting", "Flow Characteristics of an Intercooler System for Power Generating Gas Turbines", Ajay K. Agrawal, p. 357.

"Proceedings of the Advanced Turbine Systems Annual Program Review Meeting", "Improved Modeling Techniques for Turbomachinery Flow Fields", B. Lakshiminarayana, p. 371.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, p. 393.

"Proceedings of the Advanced Turbine Systems Annual Program Review Meeting", "Advanced Turbine Cooling, Heat Transfer, and Aerodynamic Studies", Je–Chin Han, p. 407.

"Proceedings of the Advanced Turbine Systems Annual Program Review Meeting", "Heat Transfer in a Two–Pass Internally Ribbed Turbine Blade Coolant Channel with Vortex Generators", S. Acharya, p. 427.

"Proceedings of the Advanced Turbine Systems Annual Program Review Meeting", "Experimental and Computational Studies of Film Cooling with Compound Angle Injection", R. Goldstein, p. 447.

"Proceedings of the Advanced Turbine Systems Annual Program Review Meeting", "Study of Endwall Film Cooling with a Gap Leakage Using a Thermographic Phosphor Fluorescence Imaging System", Minking K. Chyu, p. 461.

"Proceedings of the Advanced Turbine Systems Annual Program Review Meeting", "Steam as a Turbine Blade Coolant: External Side Heat Transfer", Abraham Engeda, p. 471.

"Proceedings of the Advanced Turbine Systems Annual Program Review Meeting", "Flow and Heat Transfer in Gas Turbine Disk Cavities Subject to Nonuniform External Pressure Field", Ramendra Roy, p. 483.

"Proceedings of the Advanced Turbine Systems Annual Program Review Meeting", "Closed–Loop Mist/Steam Cooling for Advanced Turbine Systems", Ting Wang, p. 499.

"Proceedings of the Advanced Turbine Systems Annual Program Review Meeting", "Heat Pipe Turbine Vane Cooling", Langston et al., p. 513.

"Proceedings of the Advanced Turbine Systems Annual Program Review Meeting", "EPRI's Combustion Turbine Program: Status and Future Directions", Arthur Cohn, p. 535.

"Proceedings of the Advanced Turbine Systems Annual Program Review Meeting", "ATS Materials Support", Michael Karnitz, p. 553.

"Proceedings of the Advanced Turbine Systems Annual Program Review Meeting", "Land Based Turbine Casting Initiative", Boyd A. Mueller, p. 577.

"Proceedings of the Advanced Turbine Systems Annual Program Review Meeting", "Turbine Airfoil Manufacturing Technology", Charles S. Kortovich, p. 593.

"Proceedings of the Advanced Turbine Systems Annual Program Review Meeting", "Hot Corrosion Testing of TBS's", Norman Bornstein, p. 623.

"Proceedings of the Advanced Turbine Systems Annual Program Review Meeting", "Ceramic Stationary Gas Turbine", Mark van Roode, p. 633.

"Proceedings of the Advanced Turbine Systems Annual Program Review Meeting", "Western European Status of Ceramics for Gas Turbines", Tibor Bornemisza, p. 659.

"Proceedings of the Advanced Turbine Systems Annual Program Review Meeting", "Status of Cermic Gas Turbines in Russia", Mark van Roode, p. 671.

"Status Report: The U.S. Department of Energy's Advanced Turbine systems Program", facsimile dated Nov. 7, 1996.

"Testing Program Results Validate GE's H Gas Turbine— High Efficiency, Low Cost of Electricity and Low Emissions", Roger Schonewald and Patrick Marolda.

"Testing Program Results Validate GE's H Gas Turbine— High Efficiency, Low Cost of Electricity and Low Emissions", Slide Presentation—working draft.

"The Next Step In H . . . For Low Cost Per kW–Hour Power Generation", LP–1 PGE '98.

"Utility Advanced Turbine System (ATS) Technology Readiness Testing and Pre–Commercialization Demonstration", Document #486040, Oct. 1–Dec. 31, 1996, Publication Date, Jun. 1, 1997, Report Nos.: DOE/MC/31176–5628.

"Utility Advanced Turbine System (ATS) Technology Readiness Testing—Phase 3", Document #666274, Oct. 1, 1996–Sep. 30, 1997, Publication Date, Dec. 31, 1997, Report Nos.: DOE/MC/31176–10.

"Utility Advanced Turbine System (ATS) Technology Readiness Testing and Pre–Commercial Demonstration, Phase 3", Document #486029, Oct. 1–Dec. 31, 1995, Publication Date, May 1, 1997, Report Nos.: DOE/MC/31176–5340.

"Utility Advanced Turbine System (ATS) Technology Readiness Testing and Pre–Commerical Demonstration—Phase 3", Document #486132, Apr. 1–Jun. 30, 1976, Publication Date, Dec. 31, 1996, Report Nos.: DOE/MC/31176–5660.

"Utility Advanced Turbine System (ATS) Technology Readiness Testing and Pre–Commercial Demonstration—Phase 3", Document #587906, Jul. 1–Sep. 30, 1995, Publication Date, Dec. 31, 1995, Report Nos.: DOE/MC/31176–5339.

"Utility Advanced Turbine System (ATS) Technology Readiness Testing and Pre–Commercial Demonstration" Document #666277, Apr. 1–Jun. 30, 1997, Publication Date, Dec. 31, 1997, Report Nos.: DOE/MC/31176–8.

"Utility Advanced Turbine System (ATS) Technology Readiness Testing and Pre–Commercialization Demonstration" Jan. 1–Mar. 31, 1996, DOE/MC/31176–5338.

"Utility Advanced Turbine System (ATS) Technology Readiness Testing: Phase 3R", Document #756552, Apr. 1–Jun. 30, 1999, Publication Date, Sep. 1, 1999, Report Nos.: DE–FC21–95MC31176–23.

"Utility Advanced Turbine System (ATS) Technology Readiness Testing.", Document #656823, Jan. 1–Mar. 31, 1998, Publication Date, Aug. 1, 1998, Report Nos.: DOE/MC/31176–17.

"Utility Advanced Turbine System (ATS) Technology Readiness Testing and Pre–Commercial Demonstration", Annual Technical Progress Report, Reporting Period: Jul. 1, 1995–Sep. 30, 1996.

"Utility Advanced Turbine System (ATS) Technology Readiness Testing", Phase 3R, Annual Technical Progress Report, Reporting Period: Oct. 1, 1997–Sep. 30, 1998.

"Utility Advanced Turbine System (ATS) Technology Readiness Testing", Document #750405, Oct. 1–Dec. 30, 1998, Publication Date: May 1, 1999, Report Nos.: DE–FC21–95MC31176–20.

"Utility Advanced Turbine Systems (ATS) Technology Readiness Testing", Document #1348, Apr. 1–Jun. 29, 1998, Publication Date Oct. 29, 1998, Report Nos.: DE–FC21–95MC31176–18.

"Utility Advanced Turbine Systems (ATS) Technology Readiness Testing—Phase 3", Annual Technical Progress Report, Reporting Period: Oct. 1, 1996–Sep. 30, 1997.

"Utility Advanced Turbine Systems (ATS) Technology Readiness Testing and Pre–Commercial Demonstration", Quarterly Report, Jan. 1–Mar. 31, 1997, Document #666275, Report Nos.: DOE/MC/31176–07.

"Proceedings of the 1997 Advanced Turbine Systems", Annual Program Review Meeting, Oct. 28–29, 1997.

* cited by examiner

COOLING SYSTEM FOR A BEARING OF A TURBINE ROTOR

This application is a Continuation of application Ser. No. 09/218,229 filed Dec. 22, 1998.

This invention was made with Government support under Contract No. DE-FC21-95MC31176 awarded by the Department of Energy. The Government has certain rights in this invention.

TECHNICAL FIELD

The present invention relates generally to turbines and particularly to land-based gas turbines for power generation employing closed-circuit steam-cooling paths for cooling the hot gas components. The invention more particularly relates to a cooling system for cooling a bearing of a turbine rotor and thermally insulating the bearing by inhibiting heat transfer to the bearing from a fluid medium passing through a bore tube assembly within the bearing and used for cooling the hot gas components of the turbine.

BACKGROUND OF THE INVENTION

Cooling of hot gas path components, for example, the buckets of a gas turbine, has been proposed in. the past and found particularly effective in land-based power-generating plants. While gas turbines are typically air-cooled,. for example, jet engines employ compressor discharge air for cooling hot gas components, steam-cooling of land-based turbines is more efficient because the losses associated with the use of steam as a coolant are not as great as the losses realized by extracting compressor bleed air for cooling purposes. Also, in combined cycle operations, steam-cooling is particularly advantageous because the heat energy imparted to the steam as it cools the gas turbine components is recovered as useful work in driving the steam turbine in the combined-cycle operation.

In U.S. Pat. No. 5,593,274, of common assignee herewith, there is disclosed a gas turbine having coaxial steam passages for supplying cooling steam to hot gas components of the rotor, for example, the buckets, and returning spent cooling steam to a return. From that patent, it will be seen that the cooling steam path is coaxial within the aft shaft of the rotor. In a recent gas turbine design of the assignee of this application, the aft shaft extends rearwardly from and is integral with an aft shaft wheel coupled to the turbine wheel mounting the buckets of the final stage of the turbine. The aft shaft surrounds a bore tube assembly having, elongated outer and inner tubes spaced from one another and concentric about the rotor axis defining an annular passage for conveying a cooling medium, i.e., steam, in one axial direction to the buckets of the turbine wheels and conveying spent cooling medium in an opposite axial direction within the inner tube to a return. Further, the aft shaft wheel has a plurality of radially extending conduits for conveying the cooling steam of the supply passage radially outwardly to the rim of the rotor for conveyance to the buckets. Another set of conduits in the aft shaft wheel conveys spent cooling steam from the buckets and outer rim of the rotor radially inwardly to the inner passage to a return. The axial passages and radial conduits have significant thermal impact on the aft bearing because they naturally transfer heat via conduction, radiation, forced and natural convection to the bearing. However, there is a requirement that the bearing not exceed a predetermined maximum temperature and that the aft shaft cannot exceed a maximum temperature under the forward air/oil seal. Consequently, the present invention addresses the requirement for cooling the bearing and thermally insulating the bearing by inhibiting heat transfer from the cooling medium passing through the aft shaft and bearing in a manner such that these temperature limitations are not exceeded and ample margins are provided.

BRIEF SUMMARY OF THE INVENTION

The present invention provides a cooling and. insulating system for inhibiting heat transfer from a cooling medium, e.g., steam, flowing through a bore tube assembly within the aft bearing of a gas turbine, to the aft shaft and aft bearing sufficiently that the operating temperature limitations of the aft bearing and the portions of the aft shaft under the air/oil seal have ample margin. The bore tube assembly comprises a pair of concentric tubes defining an annular coolant steam supply passage between the outer and inner concentric tubes and a spent cooling steam return passage within the inner tube. The bore tubes, as well as an aft shaft surrounding the bore tubes, form part of the rotating structure of the rotor. The forward end of the aft shaft comprises a radially projecting aft shaft wheel which is secured on the aft side of the wheel of the final-stage of the gas turbine. Conduits, in the nature of tubes, are disposed radially in the aft shaft wheel in communication with respective supply and return passages of the bore tube assembly. Consequently, the annular cooling steam supply passage supplies cooling steam to a set of radial conduits which, in turn, supply cooling steam to the rim of the rotor for delivery to the steam-cooled buckets in selected stages of the turbine. The other set of radial conduits in the aft shaft wheel conveys the hotter spent cooling steam from the steam-cooled buckets to the inner tube for return.

In order to cool the bearing and insulate it from the heat of the steam supply and return passages and conduits, a radiation shield is disposed about the outer tube and defines with the outer tube a dead air gap therebetween, thus insulating the aft shaft from direct conductive heat transfer from the outer tube to the shaft. In accordance with the present invention, there is provided a cooling fluid passageway between the heat shield and the inner surface of the aft shaft. The cooling fluid is preferably air, although other types of cooling fluids may be used, supplied from the cooling air in the aft bearing cavity or from a suitable source. The air is supplied through an in let aft of the aft bearing for flow forwardly through the passageway, thus providing an insulating and cooling flow of air, inhibiting heat transfer from the cooling steam to the aft sat The cooling fluid passageway terminates axially forwardly of the aft bearing in a plurality Of radially projecting cooling pathways which empty the cooling fluid into a forward close-out cavity between the aft shaft wheel and the forward close-out plate. That close-out cavity lies in communication with the hot gas path at a location aft of the final bucket stage and radially outwardly of the inlet to the air fluid passageway.

A significant advantage of the present system resides in the use of existing turbomachinery to obtain a natural flow of cooling air through the passage and radially outwardly into the hot gas path. For example, the bearing cavity is typically cooled by cooling air supplied at a pressure above ambient pressure and, consequently, the cooling air.:in the bearing cavity flows naturally into the air fluid passageway. Additionally, the air inlet to the cooling fluid passageway lies on a radius inwardly of the air outlet. Accordingly, a pumping action occurs to pump the cooling fluid from the bearing cavity and along the passageway into the conduits for egress into the hot gas stream. Still further, the outlet for the air fluid passageway exits into the hot gas stream at a lower pressure than the pressure of the bearing cavity. Consequently, additional pumps or the like for flowing the cooling fluid are not necessary.

In a preferred embodiment according to the present invention, there is provided in a gas turbine having a rotor rotatable about an axis including a plurality of turbine wheels mounting turbine buckets, a rotatable bore tube assembly having elongated outer and inner tubes spaced from one another and concentric about the axis defining first and second passages for respectively conveying a cooling medium in one axial direction to the buckets of at least one of the turbine wheels and conveying spent cooling medium in an axial direction opposite one direction to a return, and an aft shaft about the bore tube assembly and rotatable therewith, and a bearing about the aft shaft, a cooling system for cooling the bearing, comprising an axially extending cooling passageway concentrically about the bore tube assembly between. the outer tube and the aft shaft and radially inwardly of the bearing, the system including an inlet for admitting a cooling fluid into the passageway for flow past the bearing and an outlet for receiving the cooling fluid whereby the cooling fluid cools the bearing.

In a further preferred embodiment according to the present invention, there is provided in a gas turbine having a rotor rotatable about an axis including a plurality of turbine wheels mounting turbine buckets, a rotatable bore tube assembly having elongated outer and inner tubes spaced from one another and concentric about the axis defining respective, first and second passages for respectively conveying a cooling medium in one axial direction to the buckets of at least one of the turbine wheels and conveying spent cooling medium in an axial direction opposite one direction to a return, and an aft shaft about the bore tube assembly and rotatable therewith, and a bearing about the aft shaft, a method of minimizing heat transfer from the cooling medium to the bearing, comprising the steps of providing an axially extending cooling passageway concentrically about the bore tube. assembly between the outer tube and the aft shaft and radially inwardly of the bearing and flowing a cooling fluid in the passageway past the bearing for minimizing transfer of heat from the cooling medium in the bore. tube assembly to the bearing.

Accordingly, it is a primary object of the present invention to provide a cooling and thermal insulating system and methods of operating the system for cooling the bearing of a gas turbine rotor by inhibiting heat transfer to the bearing from a cooling medium passing through the bearing.

DETAILED DESCRIPTION OF THE INVENTION

Figure 1:
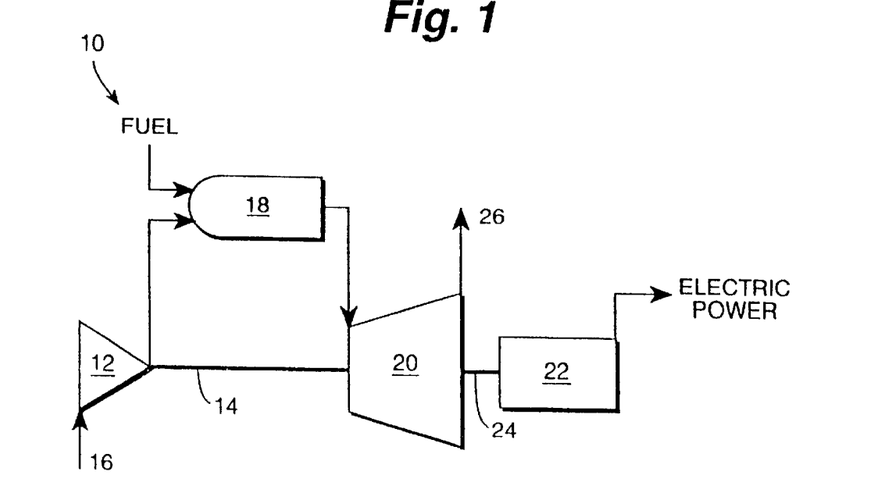
FIG. 1 is a schematic illustration of a power generation system incorporating a gas turbine with the cooling and thermal insulation system for the aft bearing of the turbine according to the present invention.

FIG. 1 is a schematic diagram of a simple cycle, single-shaft heavy-duty gas turbine 10 incorporating the present invention. The gas turbine may be considered as comprising a multi-stage axial flow compressor 12 having a rotor or rotor shaft 14. Air enters the inlet of the compressor at 16, is compressed by the axial flow compressor 12 and then is discharged to a combustor 18 where fuel such as natural gas is burned to provide high-energy combustion gases which drive the turbine 20. In the turbine 20, the energy of the hot gases is converted into work, some of which is used to drive the compressor 12 through shaft 14, with the remainder being available for useful work to drive a load such as a generator 22 by means of rotor shaft 24 for producing electricity. A typical simple cycle gas turbine will convert 30 to 35% of the fuel input into shaft output. All but 1 to 2% of the remainder is in the form of exhaust heat which exits turbine 20 at 26. Higher. efficiencies can be obtained by utilizing the gas turbine 10 in a combined cycle configuration in which the energy in the turbine exhaust stream is converted into additional useful work.

Figure 2:
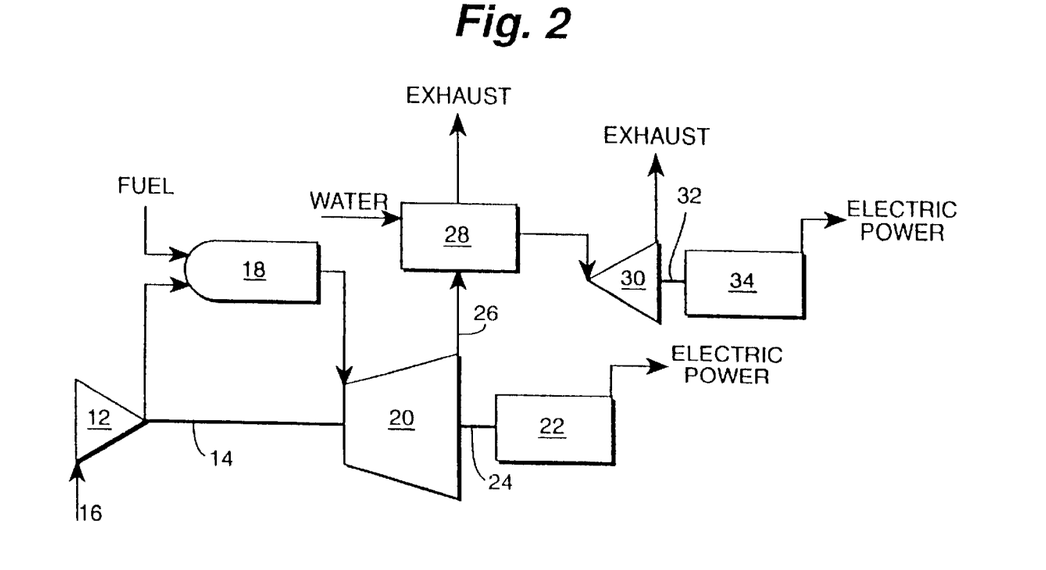
FIG. 2 is a schematic diagram of a combined-cycle system incorporated in the present invention and employing a gas turbine and heat recovery steam generator for greater efficiency.

FIG. 2 represents a combined cycle in its simplest form, in which the exhaust gases exiting turbine 20 at 26 enter a heat recovery steam generator 28 in which water is converted to steam in the manner of a boiler. Steam thus produced drives one or more steam turbines 30 in which additional work is extracted to drive through shaft 32 an additional load such as a second generator 34 which, in turn, produces additional electric power. In some configurations, turbines 20 and 30 drive a common generator. Combined cycles producing only electrical power are generally in the 50 to 60% thermal efficiency range and using a more advanced gas turbine, of which the present tube assembly forms a part, permits efficiencies in excess of 60%.

Figure 3:
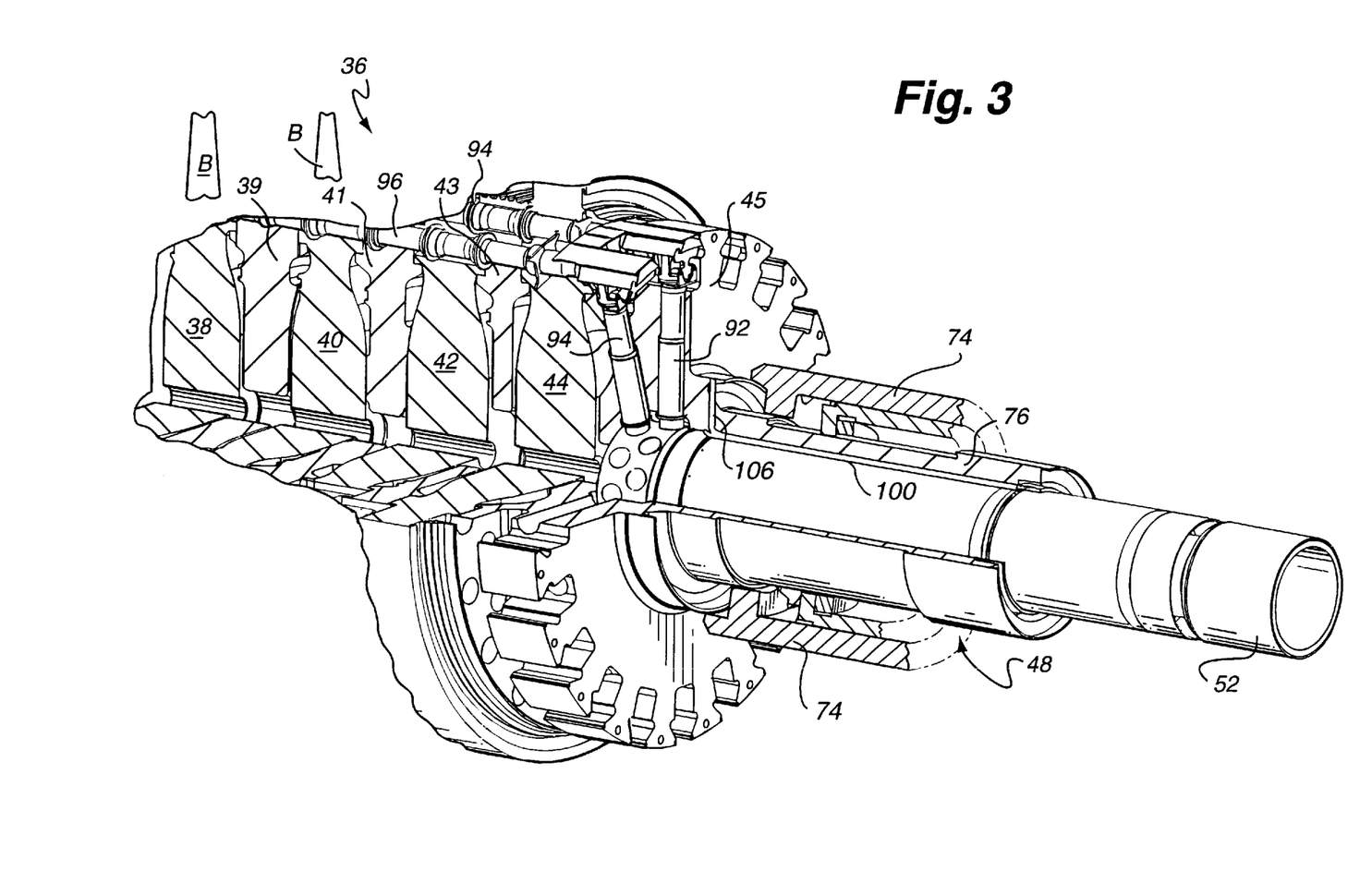
FIG. 3 is a fragmentary perspective view with portions broken out and in cross-section of a bore tube assembly with a surrounding aft bearing and a portion of the main rotor constructed in accordance with the present invention.

Referring to FIG. 3, the turbine section, generally indicated 36, of the rotor shaft 24 is in part illustrated. The turbine section 36 includes a number of stages, e.g., four successive stages comprising turbine wheels 38, 40, 42 and 44 mounted to and forming part of the rotor shaft for rotation therewith, each carrying a row of buckets, two buckets B being illustrated for wheels 38 and 40, respectively, which buckets project radially outwardly of the wheels. The buckets are, of course, arranged alternately between fixed nozzles, also not shown. Between the wheels 38, 40, 42 and 44, there are provided spacer disks 39, 41, 43. A coolant supply and return aft disk 45 forming an integral part of an aft shaft 76 is provided on the aft side of the last stage turbine wheel 44. It will be appreciated that the wheels and disks are secured to one another by a plurality of circumferentially spaced, axially extending bolts, not shown, as is conventional in gas turbine construction.

A bore tube assembly incorporating the cooling and thermal insulation system according to the present invention is generally designated 48. Assembly 48 forms part of the rotor, is mounted for rotation about the rotor axis A and is connected to the cooling supply and return aft disk 45. The bore tube assembly 48 and aft disk 45 cooperate to provide a flow of a cooling medium, e.g., steam, to the turbine buckets of at least one of the turbine stages and preferably to the first two stages of the turbine and a passage for flow of the spent cooling medium, e.g., steam, to a return R (FIG.

4C). The cooling system may be provided as part of a closed-circuit steam cooling supply and return system in a combined cycle system, i.e., split off from the high pressure steam turbine exhaust or may be supplied from an existing in-plant supply.

The bore tube assembly 48 includes an outer tube 50 and an inner tube 52 concentric with outer tube 50 about the axis of rotation A of the rotor shaft 24. The outer and inner tubes 50 and 52, respectively, define an annular cooling steam supply passage 54, while the inner tube 52 provides a spent cooling steam return passage 56. Referring to FIGS. 4B and 4C, a steam gland 58 is disposed about the bore tube assembly. It will be appreciated that the steam gland 58 is fixed and the bore tube assembly rotates about the rotor shaft axis A. A steam plenum 60 connected to a supply of steam from a suitable source, not shown, lies in communication with a steam inlet 62 formed through the outer tube 50 for supplying cooling steam to the passage 54 between the outer and inner tubes 50 and 52. Labyrinth-type seals 64 and 66, preferably spring-biased, are provided on opposite sides of the steam gland 58 for sealing about the outer tube 50. The aft end of the steam gland 58 is connected with a stationary steam pipe schematically illustrated by return R for the spent cooling steam. The steam gland also includes leakage steam plenums 70 and 72 for collecting steam leaking past the labyrinth seals such that the steam will not flow forwardly to the aft main bearing 74.

Figure 4A:
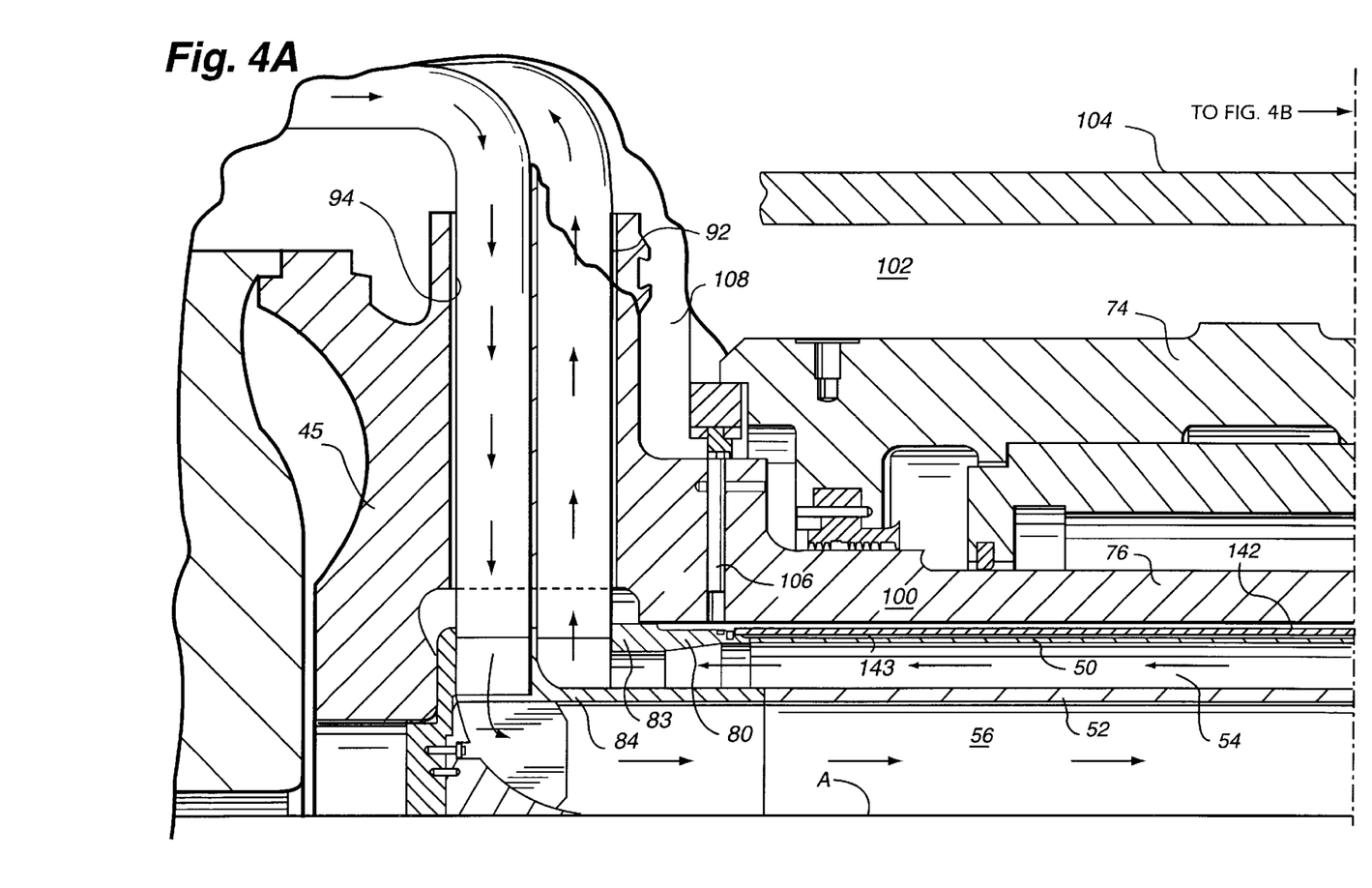
FIGS. 4A, 4B and 4C are fragmentary partial enlarged cross-sectional views of the bore tube assembly with surrounding aft bearing, the drawing figures forming continuations of one another along the indicated separation lines.
Figure 4B:
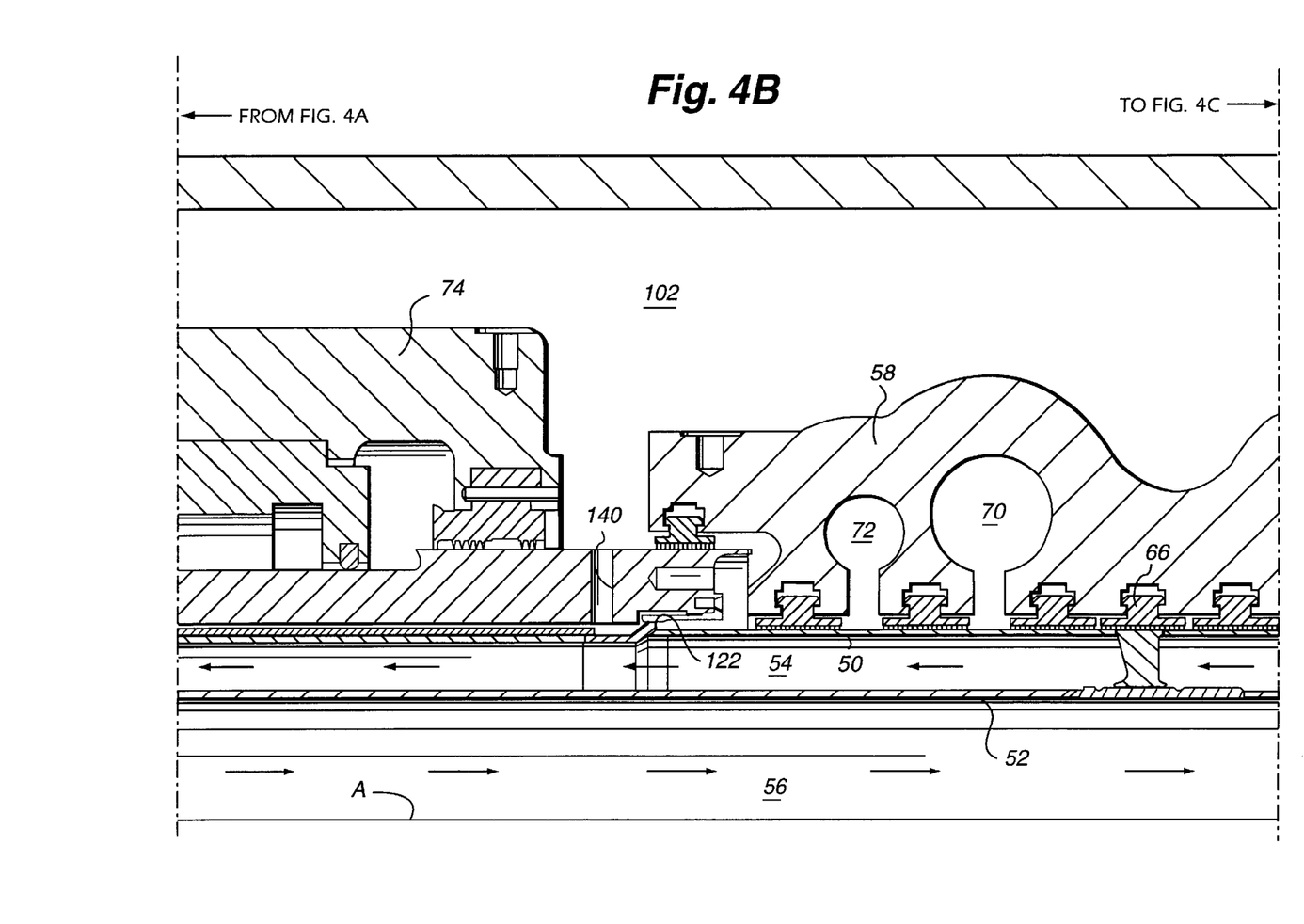
Figure 4C:
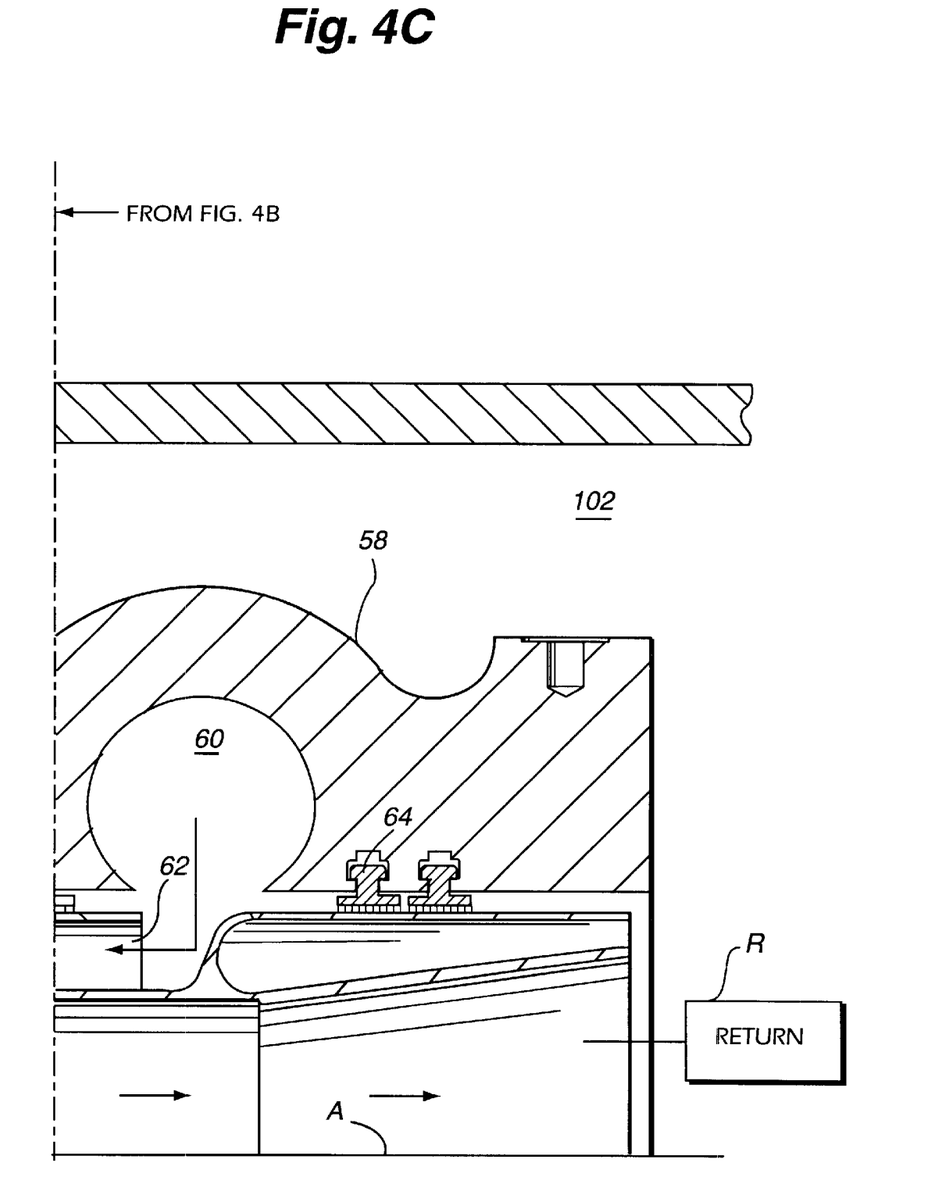
Figure 5:
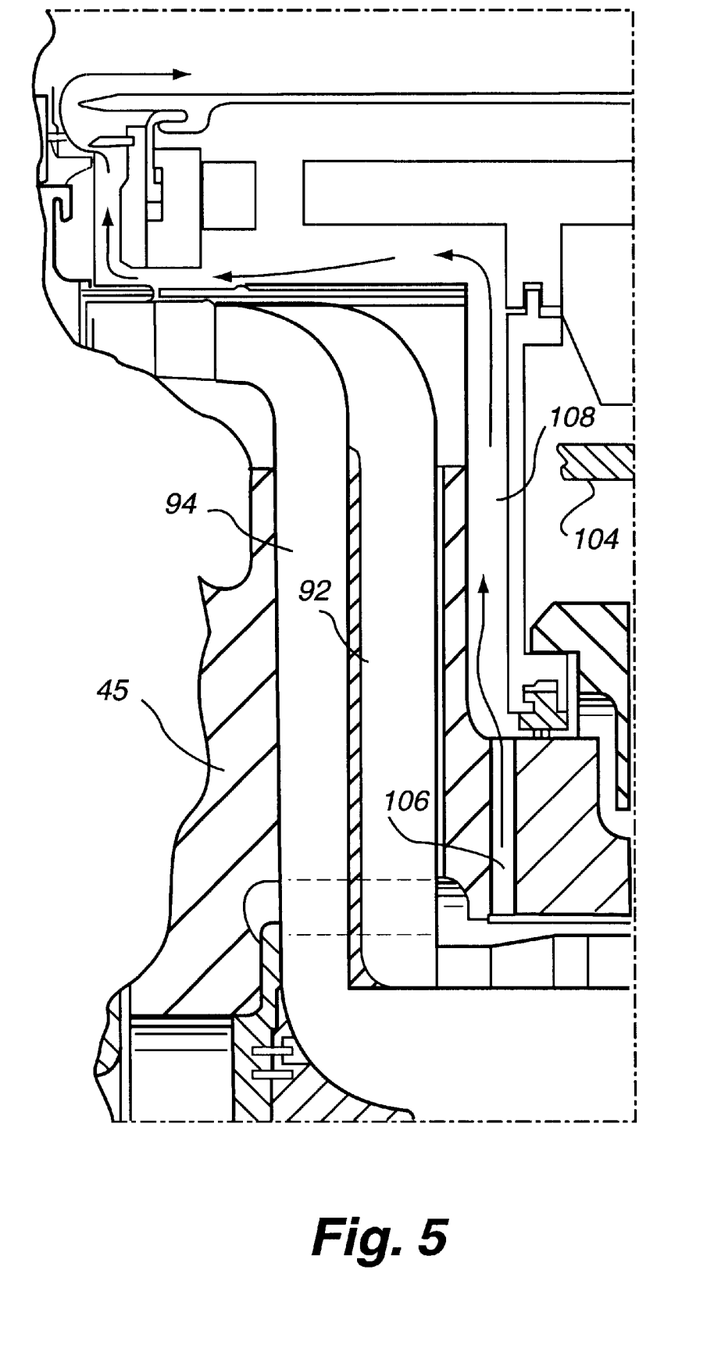
FIG. 5 is a fragmentary cross-sectional view illustrating the cooling air exit path for the aft bearing cooling and thermal insulation system hereof.

Referring to FIGS. 4A and 4B, bearing 74 is a conventional bearing. Bearing 74 surrounds the aft shaft 76 which is integral with disk 45, aft shaft 76 being rotatable with the bore tube assembly 48. Various seals are disposed at opposite ends of the aft main bearing cooperable with the aft shaft to seal the main bearing.

Referring to FIG. 4A, the forward end of the bore tube assembly includes an end cap, generally designated 80, which is described in detail in companion application Ser. No. 09/216,363, filed Dec. 12, 1998 (Attorney Docket 839-540), the disclosure of which is incorporated herein by reference. The end cap 80 includes concentric cylindrical members or sleeves 83 and 84 which define an outer passageway in communication with passage 54 and ad inner passage in communication with passage 56. The end cap includes sets of radial openings in communication with tubes 92 and 94 for supplying steam radially outwardly to the periphery of the rotor and to the buckets to be cooled and returning spent steam from the rotor buckets via tube 94 to inner passage 56 to return R, respectively. Suffice to say that the axial and radially extending cooling steam supply and return passages lie closely adjacent the bearing 74 whereby a significant magnitude of heat may be transferred from the bore tube assembly including from within the aft shaft disk through the aft shaft to the bearing. Heat transferred to bearing 74 beyond a predetermined temperature limit could adversely and catastrophically affect the operation of the turbine. To prevent this and to cool the bearing, as well as thermally insulate the bearing from heat transfer from the steam cooling passages, there is provided a heat shield 142 concentrically about the outer tube 50. A dead air gap 143 is also provided between the heat shield and the outer tube 50 whereby heat transfer by conduction radially outwardly toward the aft shaft and bearing from the passages 54 and 56 is inhibited.

In accordance with the present invention, there is provided a coolant flow passageway between the heat shield 142 and the aft shaft 76 within the bearing 74. A cooling fluid, preferably air, flows through the passageway 100 from a cooling fluid inlet 140 (FIG. 4B). As illustrated in the drawing figures, the cooling fluid inlet 140 lies in communication with the bearing cavity 102 within the bearing cavity housing 104. The bearing housing defining cavity 102 is supplied with a cooling fluid, i.e., air, under a pressure slightly elevated above ambient pressure. Thus, the air in cavity 102 is in free communication with the inlet 140 to the passage 100. At the axially opposite end of passage 100 and forwardly of the bearing 74, there are provided a plurality of generally radially extending bores forming pathways for receiving the cooling air flowing forwardly along passageway 100. The radial pathways 106 extend in the aft disk between the bearing 74 and the radially extending conduits 92 and 94, respectively, supplying steam to the buckets and conveying spent steam to return R. Consequently, the bores 106 cool the aft shaft disk 45 in that region. Additionally, the bores 106 empty into the forward closure plate cavity 108 which further cools the aft shaft disk. The cavity 108 in turn communicates through the angel wings on the dovetail of the last-stage bucket wheel to enable the air exiting the closure plate cavity 108 to exit into the hot gas stream.

It will be appreciated that the flow of cooling fluid, i.e., air, flows naturally along passage 100 and through the pathways 106 without the assistance of external pumps or the like. The air pressure in the bearing cavity 102 is elevated above ambient pressure sufficiently such that air flows naturally from the cavity into inlet 140 and along passageway 100 to the radial pathways 106. Further, because the inlet 140 is located radially inwardly of the outlets to the radial pathways 106, a pumping action occurs resulting from rotation of the rotor, pumping the cooling fluid from the bearing cavity 102 into the forward closure plate cavity 108. Still further, because the hot gas stream exits the final stage of the turbine at a very low pressure, the pressure differential between the bearing cavity 102 and the pressure of the hot gas stream at the exit area for the cooling air induces the flow forwardly along passageway 100 and through the pathways 106 and closure plate cavity 108.

Consequently, by supplying a. cooling fluid interiorly along the inner surface of the aft shaft 76 inwardly of the bearing, the air/oil seal and the bearing 74 per se are thermally insulated from the cooling steam supplied through the bore tube assembly to the rotor buckets. Additionally, the passage of the cooling air through the radial pathways 106 extracts heat from the aft shaft disk 45 as that heat is transmitted in an aft direction toward the bearing sufficiently such that the temperature of the aft shaft and the main bearing are maintained below a predetermined temperature and sufficient margin is provided to avoid problems associated with hot gas ingestion.

While the invention has been described in connection with what is presently considered to be the most practical and preferred embodiment, it is to be understood that the invention is not to be limited to the disclosed embodiment, but on. the contrary, is intended to cover various modifications and equivalent arrangements included within the spirit and scope of the appended claims.

What is claimed is:

1. In a gas turbine having a rotor rotatable about an axis including a plurality of turbine wheels mounting turbine buckets, a rotatable bore tube assembly having elongated outer and inner tubes spaced from one another and concentric about said axis defining first and second passages for respectively conveying a cooling medium in one axial direction to the buckets of at least one of said turbine wheels and conveying spent cooling medium in an axial direction opposite said one direction to a return, and an aft shaft about said bore tube assembly and rotatable therewith, and a bearing about said aft shaft, a cooling system for cooling the bearing, including an axially extending cooling passageway concentrically about said bore tube assembly between said outer tube and said aft shaft and radially inwardly of said bearing, said system including an inlet for admitting a cooling fluid into said passageway for flow past said bearing and an outlet for receiving the cooling fluid whereby the cooling fluid cools said bearing, said turbine having a plurality of stages forming a hot gas path, said cooling fluid outlet lying in communication with said hot gas path downstream of said stages.

2. A cooling system according to claim 1 including an axially extending heat shield about said outer tube and defining radial interior surface portions of said cooling fluid passageway.

3. A cooling system according to claim 2 wherein said heat shield and said outer tube define an annular thermal insulating gap therebetween radially inwardly of said heat shield.

4. A cooling system according to claim 2 wherein said cooling fluid outlet lies at a position radially outwardly of said cooling fluid inlet for said passageway whereby the rotation of said bore tube assembly and said aft shaft pump said cooling fluid from said cooling fluid inlet for said passageway to said cooling fluid outlet.

5. A cooling system according to claim 1 including a housing defining a cavity about said bearing for containing cooling fluid at a pressure elevated above ambient pressure, said cavity lying in communication with said cooling fluid inlet for said passageway.

6. In a gas turbine having a rotor rotatable about an axis including a plurality of turbine wheels mounting turbine buckets, a rotatable bore tube assembly having elongated outer and inner tubes spaced from one another and concentric about said axis defining first and second passages for respectively conveying a cooling medium in one axial direction to the buckets of at least one of said turbine wheels and conveying spent cooling medium in an axial direction opposite said one direction to a return, and an aft shaft about said bore tube assembly and rotatable therewith, and a bearing about said aft shaft, a cooling system for cooling the bearing, including an axially extending cooling passageway concentrically about said bore tube assembly between said outer tube and said aft shaft and radially inwardly of said bearing, said system including an inlet for admitting a cooling fluid into said passageway for flow past said bearing and an outlet for receiving the cooling fluid whereby the cooling fluid cools said bearing, a housing defining a cavity about said bearing for containing a cooling fluid at a pressure elevated above ambient pressure, said cavity lying in communication with said cooling fluid inlet for said passageway, said cooling fluid outlet lying at a position radially outwardly of said cooling fluid inlet for said passageway whereby the rotation of said bore tube assembly and said aft shaft pump said cooling fluid from said cooling fluid inlet for said passageway to said cooling fluid outlet.

7. In a gas turbine having a rotor rotatable about an axis including a plurality of turbine wheels mounting turbine buckets, a rotatable bore tube assembly having elongated outer and inner tubes spaced from one another and concentric about said axis defining first and second passages for respectively conveying a cooling medium in one axial direction to the buckets of at least one of said turbine wheels and conveying spent cooling medium in an axial direction opposite said one direction to a return, and an aft shaft about said bore tube assembly and rotatable therewith, and a bearing about said aft shaft, a cooling system for cooling the bearing, including an axially extending cooling passageway concentrically about said bore tube assembly between said outer tube and said aft shaft and radially inwardly of said bearing, said system including an inlet for admitting a cooling fluid into said. passageway for flow past said bearing and an outlet for receiving the cooling fluid whereby the cooling fluid cools said bearing, said cooling fluid outlet lying at a position radially outwardly of said cooling fluid inlet for said passageway whereby the rotation of said bore tube assembly and said aft shaft pump said cooling fluid from said cooling fluid inlet for said passageway to said cooling fluid outlet, said turbine having a plurality of stages forming a hot gas path, said cooling fluid outlet lying in communication with said hot gas path downstream of said stages.

8. A cooling system according to claim 7 including a housing defining a cavity about said bearing for containing a cooling fluid at a pressure elevated above ambient pressure, said cavity lying in communication with said/ cooling fluid inlet for said passageway.

9. In a gas turbine having a rotor rotatable about an axis including a plurality of turbine wheels mounting turbine buckets, a rotatable bore tube assembly having elongated outer and inner tubes spaced from one another and concentric about said axis defining first and second passages for respectively conveying a cooling medium in one axial direction to the buckets of at least one of said turbine wheels and conveying spent cooling medium in an axial direction opposite said one direction to a return, and an aft shaft about said bore tube assembly and rotatable therewith, and a bearing about said aft shaft, a cooling system for cooling the bearing, including an axially extending cooling passageway concentrically about said bore tube assembly between said outer tube and said aft shaft and radially inwardly of said bearing, said system including an inlet for admitting a cooling fluid into said passageway for flow past said bearing and an outlet for receiving the cooling fluid whereby the cooling fluid cools said bearing, said aft shaft including an aft shaft disk connected to a wheel of the turbine forming part of a final stage thereof, first and second sets each of a plurality of generally radially extending conduits in said aft shaft disk lying in communication with said passages, respectively, said conduits being spaced axially from said bearing, and a plurality of cooling pathways disposed in said aft shaft disk in communication with said passageway for cooling the aft shaft disk, thereby inhibiting transfer of heat in the aft shaft disk resulting from heat transfer from the conduits to the aft shaft disk to the bearing.

10. In a gas turbine having a rotor rotatable about an axis including a plurality of turbine wheels mounting turbine buckets, a rotatable bore tube assembly having elongated outer and inner tubes spaced from one another and concentric about said axis defining first and second passages for respectively conveying a cooling medium in one axial direction to the buckets of at least one of said turbine wheels and conveying spent cooling medium in an axial direction opposite said one direction to a return, and an aft shaft about said bore tube assembly and rotatable therewith, and a bearing about said aft shaft, a cooling system for cooling the bearing, including an axially extending cooling passageway concentrically about said bore tube assembly between said outer tube and said aft shaft and radially inwardly of said bearing, said system including an inlet for admitting a cooling fluid into said passageway for flow past said bearing and an outlet for receiving the cooling fluid whereby the cooling fluid cools said bearing, said aft shaft including an aft shaft disk connected to a wheel of the turbine forming part of a final stage thereof, first and second sets each of a plurality of generally radially extending conduits in said aft shaft disk lying in communication with said passages, respectively, said conduits being spaced axially from said bearing, and a plurality of cooling pathways disposed in said aft shaft disk in communication with said passageway for cooling the aft shaft disk, thereby inhibiting transfer of heat in the aft shaft disk resulting from heat transfer from the conduits to the aft shaft disk to the bearing, said pathways in said aft shaft disk lying axially between said conduits and said bearing.

11. A cooling system according to claim 10 including a housing defining a cavity about said bearing for containing a cooling fluid at a pressure elevated above ambient pressure, said cavity lying in communication with said cooling fluid inlet for said passageway.

12. A cooling system according to claim 10 wherein said cooling fluid outlet lie at a radial position radially outwardly of said cooling fluid inlet for said passageway whereby the rotation of said bore tube assembly and said aft shaft pump said cooling fluid from said cooling fluid inlet for said passageway to said cooling fluid outlet.

13. A cooling system according to claim 10 wherein said turbine has a plurality of stages forming a hot gas path, said cooling fluid outlet lying in communication with said hot gas path downstream of said stages.

14. A cooling system according to claim 10 including a housing defining a cavity about said bearing for containing a cooling fluid at a pressure elevated above ambient pressure, said cavity lying in communication with said cooling fluid inlet for said passageway, said cooling fluid outlet lying at a radial position radially outwardly of said cooling fluid inlet for said passageway whereby the rotation of said bore tube assembly and said aft shaft pump said cooling fluid from said cooling fluid inlet for said passageway to said cooling fluid outlet.

15. A cooling system according to claim 10 wherein said cooling fluid outlet lies at a radial position radially outwardly of said cooling fluid inlet for said passageway whereby the rotation of said bore tube assembly and said aft shaft pump said cooling fluid from said cooling fluid inlet for said passageway to said cooling fluid outlet, said turbine having a plurality of stages forming a hot gas path, said cooling fluid outlet lying in communication with said hot gas path downstream of said stages.

16. A cooling system according to claim 15 including a housing defining a cavity about said bearing for containing a cooling fluid at a pressure elevated above ambient pressure, said cavity lying in communication with said cooling fluid inlet for said passageway.

17. In a gas turbine having a rotor rotatable about an axis including a plurality of turbine wheels mounting turbine buckets, a rotatable bore tube assembly having elongated outer and inner tubes spaced from one another and concentric about said axis defining respective first and second passages for respectively conveying a cooling medium in one axial direction to the buckets of at least one of said turbine wheels and conveying spent cooling medium in an axial direction opposite said one direction to a return, and an aft shaft about said bore tube assembly and rotatable therewith, and a bearing about said aft shaft wherein said turbine has a plurality of stages forming a hot gas path, a method of minimizing heat transfer from the cooling medium to said bearing, comprising the step of:

flowing a cooling fluid in a cooling passageway between said outer tube and said aft shaft and past said bearing for minimizing transfer of heat from the cooling medium in said bore tube assembly to said bearing, and flowing said cooling fluid downstream of said bearing into the hot gas path at a location downstream of said stages.

* * * * *